G. LONG.
ALARM GOVERNOR.
APPLICATION FILED SEPT. 22, 1910.
1,026,099.
Patented May 14, 1912.
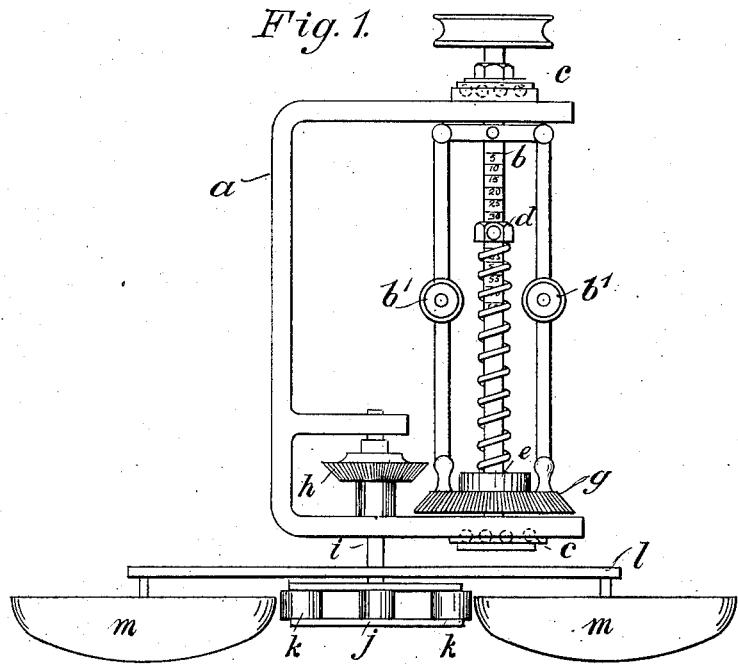
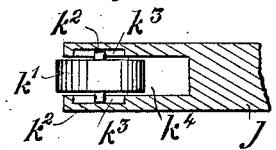
Witnesses
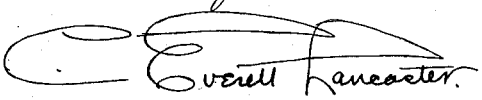
Inventor,
George Long.
By
Attorney.

UNITED STATES PATENT OFFICE.

GEORGE LONG, OF LONDON, ENGLAND.

ALARM-GOVERNOR.

1,026,099.  Specification of Letters Patent.  Patented May 14, 1912.

Application filed September 22, 1910. Serial No. 583,308.

*To all whom it may concern:*

Be it known that I, GEORGE LONG, of 231 Amhurst road, Stoke Newington, London, England, estate agent, have invented an Alarm-Governor; and I do hereby declare that the following is a full, clear, and exact description of the same, reference being had to the accompanying drawings, forming a part hereof.

This invention has reference to apparatus for automatically indicating the attainment of a given speed of a rotating shaft by means of which an alarm is sounded when a certain pre-determined speed has been attained. The invention has particular reference to devices for this purpose in which a centrifugal governor is employed, the sliding collar of which is adapted, as it rises owing to the increased speed of the driven shaft, to actuate the mechanism for sounding an alarm.

My invention is primarily designed for use with motor road vehicles, but it is to be distinctly understood that I do not desire to limit myself to such use as it may be employed for other forms of mechanism where it is desired to give audible notice when a revolving shaft exceeds a certain pre-determined limit.

My invention consists in certain novel features of construction and the combination and arrangement of parts, all as more particularly described hereinafter and finally pointed out in the claim, and in order that my invention may be readily understood and carried into effect by those skilled in the art to which it appertains I will now proceed to describe the same fully with reference to the accompanying drawings, in which:—

Figure 1 illustrates a plan view partly in section of an apparatus embodying my invention. Fig. 2 is a detailed sectional view hereinafter more particularly referred to.

$a$ indicates an appropriate bracket in which is revolubly mounted the governor spindle $b$ carrying a centrifugal governor $b'$ of known construction and driven by any suitable means (not shown). Said spindle $b$ is mounted in the bracket $a$ by means of ball bearings $c$ and is rectangular in cross section between its points of support. Carried by the spindle $b$ is a sliding collar or nut $d$ adapted to be secured in the desired position on spindle $b$ by means of a set screw, or other means, and between said collar $d$ and the sliding collar $e$ of the governor is arranged a spiral compression spring $f$. Formed integrally with the collar $e$ is a beveled pinion $g$ adapted to engage in the operative position of the parts as hereinafter explained with a second beveled pinion $h$ carried upon a spindle $i$ revolubly mounted in the bracket $a$. To the spindle $i$ is attached in such a manner as to revolve therewith a cross bar $j$ provided with clappers $k$ so mounted in the ends of the bar $j$ as to be projected therefrom when this latter is revolved. This is effected as follows:—The clappers $k$ comprise disks $k'$ (Fig. 2) mounted upon pivots $k^2$ sliding in recesses $k^3$ formed in the slotted housing $k^4$ in the ends of the bar $j$. $l$ indicates a plate or support which may for example be secured to the bracket $a$ and carrying a number of gongs or bells $m$ which latter may, in order to give further emphasis to the particular nature of the warning expressed, be of various tones thus providing an alarm of an unmistakable character.

In order to enable the person in charge to set the apparatus to sound the alarm upon a certain pre-determined speed being attained the spindle $b$ is graduated so as to indicate the exact position in which the nut $d$ should be secured to cause the device to become operative at that speed for it will be obvious that the greater the compression of spring $f$ the greater the resistance will it offer to the operation of the governor balls.

The operation of my improved device is as follows: The nut $d$ having been secured in the desired position upon the spindle $b$ thus more or less compressing spring $f$, the governor $b'$ will when operated tend to cause the sleeve $e$ to slide upon the spindle $b$ against the resistance of the spring $f$. When the speed of the spindle $b$ is sufficiently great to cause the governor $b'$ to overcome the effort of the spring $f$ the bevel pinion $g$ will be brought into engagement with the bevel pinion $h$ thus rotating the same together with spindle $i$ and its attached cross bar $j$. Under the influence of centrifugal force the disks $k'$ will be projected beyond the ends of the cross bar $j$ by reason of the pivots $k^2$ upon which the disks $k'$ are slidably mounted in the slots $k^2$ thus causing said disks $k'$ to successively strike the gongs $m$ as the bar $j$ revolves.

To further insure disks $k'$ projecting beyond the ends of bar $j$ I may if desired bend these latter slightly downward.

It will be seen that a device constructed in accordance with my invention forms a simple and efficient means of sounding an alarm when the speed of a rotating shaft exceeds a predetermined limit and when applied to a motor vehicle it will be seen that the only way in which the device may be rendered inoperative is for the speed to be maintained below the limit set, for directly the speed exceeds such limit the gongs will be operated and will continue to be sounded until the speed is reduced below the set limit.

What I do claim as my invention and desire to receive by Letters Patent is:—

An alarm governor mechanism comprising in combination, a frame, a vertically disposed shaft rotatively mounted in said frame and provided with graduations thereon, a locking member on said shaft movable abreast of said graduations, a loosely mounted gear on said shaft, a centrifugal governor mounted on said shaft and connected with said gear to raise the same, a spring on said shaft between said locking member and said gear wheel, a clapper shaft provided with a gear wheel adapted to mesh with said first named gear wheel when the latter is raised by said governor, a clapper device on said clapper shaft, and sounding members in the path of said clapper device.

In testimony whereof I affix my signature in presence of two witnesses.

GEORGE LONG.

Witnesses:
 GEORGE PRINGLE,
 GEORGE HUGHES.

---

Copies of this patent may be obtained for five cents each, by addressing the "Commissioner of Patents, Washington, D. C."